United States Patent
Hockett et al.

(10) Patent No.: US 9,930,085 B2
(45) Date of Patent: Mar. 27, 2018

(54) SYSTEM AND METHOD FOR INTELLIGENT CONFIGURATION OF AN AUDIO CHANNEL WITH BACKGROUND ANALYSIS

(71) Applicant: INTERNATIONAL BUSINESS MACHINES CORPORATION, Armonk, NY (US)

(72) Inventors: Hugh E. Hockett, Raleigh, NC (US); Rahul Ghosh, Durham, NC (US); Aaron J. Quirk, Cary, NC (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/867,495

(22) Filed: Sep. 28, 2015

(65) Prior Publication Data

US 2017/0093944 A1    Mar. 30, 2017

(51) Int. Cl.
    *G06F 17/00*     (2006.01)
    *H04L 29/06*     (2006.01)
    *H04L 29/08*     (2006.01)
    *H04L 12/18*     (2006.01)
    *H04M 3/56*      (2006.01)

(52) U.S. Cl.
    CPC ........ *H04L 65/601* (2013.01); *H04L 12/1813* (2013.01); *H04L 67/22* (2013.01); *H04M 3/568* (2013.01)

(58) Field of Classification Search
    CPC ................ H04N 7/155; H04N 21/4396
    See application file for complete search history.

(56) References Cited

U.S. PATENT DOCUMENTS

| 6,952,471 B1 | 10/2005 | Cannon et al. |
| 8,064,969 B2 | 11/2011 | Diethorn et al. |
| 8,553,067 B2 | 10/2013 | Shaffer et al. |

(Continued)

FOREIGN PATENT DOCUMENTS

| WO | 2014027190 A1 | 2/2014 |
| WO | 2014060647 A1 | 4/2014 |

OTHER PUBLICATIONS

IPCOM000220228D, "A System and Method to Discern Relative Location Between Smart Mobile Terminals Using Speaker and Microphone", published Jul. 26, 2012; 5 Pages.

(Continued)

*Primary Examiner* — Joseph Saunders, Jr.
(74) *Attorney, Agent, or Firm* — Cantor Colburn LLP; Richard Wilhelm

(57) ABSTRACT

Methods, systems and computer program products for configuring an audio channel are provided. Aspects include generating a confidence metric indicative of at least one control cue in a telecommunication audio feed input. Generating the confidence metric can include analyzing the control cue to determine a cue type, assigning a confidence metric value for the control cue based on the cue type, and comparing the confidence metric value to a predetermined threshold value associated with the cue type. Aspects also include updating a context history with the cue type and configuring an audio channel output based on the confidence metric and context history.

19 Claims, 9 Drawing Sheets

(56) References Cited

U.S. PATENT DOCUMENTS

| | | | |
|---|---|---|---|
| 8,681,203 B1 * | 3/2014 | Yin | H04N 7/15 348/14.08 |
| 8,744,425 B2 | 6/2014 | Miwa | |
| 2007/0263805 A1 * | 11/2007 | McDonald | H04L 12/66 379/93.26 |
| 2008/0158000 A1 | 7/2008 | Mattrazzo | |
| 2011/0319128 A1 * | 12/2011 | Miwa | H04M 1/6008 455/550.1 |
| 2013/0235994 A1 | 9/2013 | Hanson et al. | |
| 2016/0055859 A1 * | 2/2016 | Finlow-Bates | G10L 21/0202 704/225 |
| 2016/0182727 A1 * | 6/2016 | Baran | H04M 3/568 379/88.02 |

OTHER PUBLICATIONS

IPCOM000236535D, "A Method and Apparatus for Smart Auto-Mute of Conference Participants", published May 1, 2014; 12 pages.

\* cited by examiner

SYSTEM AND METHOD FOR INTELLIGENT CONFIGURATION OF AN AUDIO CHANNEL WITH BACKGROUND ANALYSIS

The present disclosure relates to intelligent configuration of audio channels, and more specifically, to intelligent configuration of audio channels with background analysis.

When participating in a conference call or webcast, most users take advantage of the mute feature extensively to ensure background noise from their environment does not interfere with the audio stream. However, when the person wishes to speak, they often forget to unmute the microphone before speaking. Also, it may take several seconds to operate the "unmute" feature (e.g., a virtual or real button), especially if the client device is a smartphone. Smartphones may be especially problematic because the unmute is typically a soft key that can be nested behind one or more virtual menu options, requiring several screen touches to navigate.

This can be a frustrating experience for both the speaker and the listener, since there can be a delay before the speaker can begin speaking. Even worse, they may begin speaking without turning off the mute function, and the audience can miss important content. It may be advantageous to provide systems and methods for intelligent operation of a mute and unmute control of an audio channel by analyzing conversation context, background noise, and other cues.

SUMMARY

According to some embodiments, a method for configuring an audio channel is described. The method may include generating a confidence metric indicative of at least one control cue in a telecommunication audio feed input. Generating the confidence metric can include analyzing the at least one control cue to determine a cue type, assigning a confidence metric value for the at least one control cue based on the cue type, and comparing the confidence metric value to a predetermined threshold value associated with the cue type. The method can further include updating a context history with the cue type and configuring an audio channel output based on the confidence metric and context history.

According to other embodiments, a system for configuring an audio channel is described. The system can include an audio input device configured to receive a telecommunication audio feed input and a processor operatively connected to the audio input device. The processor may be configured to monitor the audio feed input, generate a confidence metric indicative of at least one control cue in the audio feed input, determine a cue type, assign a confidence metric value for the at least one control cue based on the cue type, compare the confidence metric value to a predetermined threshold value associated with the cue type, update a context history with the cue type and the confidence metric value, and configure an audio channel output based on the confidence metric and the context history.

According to another embodiment, a non-transitory computer-readable storage medium is described. The storage medium can store a computer program product executable to perform a method. The method can include generating a confidence metric indicative of at least one control cue in a telecommunication audio feed input. Generating the confidence metric can include analyzing the at least one control cue to determine a cue type, assigning a confidence metric value for the at least one control cue based on the cue type, and comparing the confidence metric value to a predetermined threshold value associated with the cue type. The method can further include updating a context history with the cue type and configuring an audio channel output based on the confidence metric and context history.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
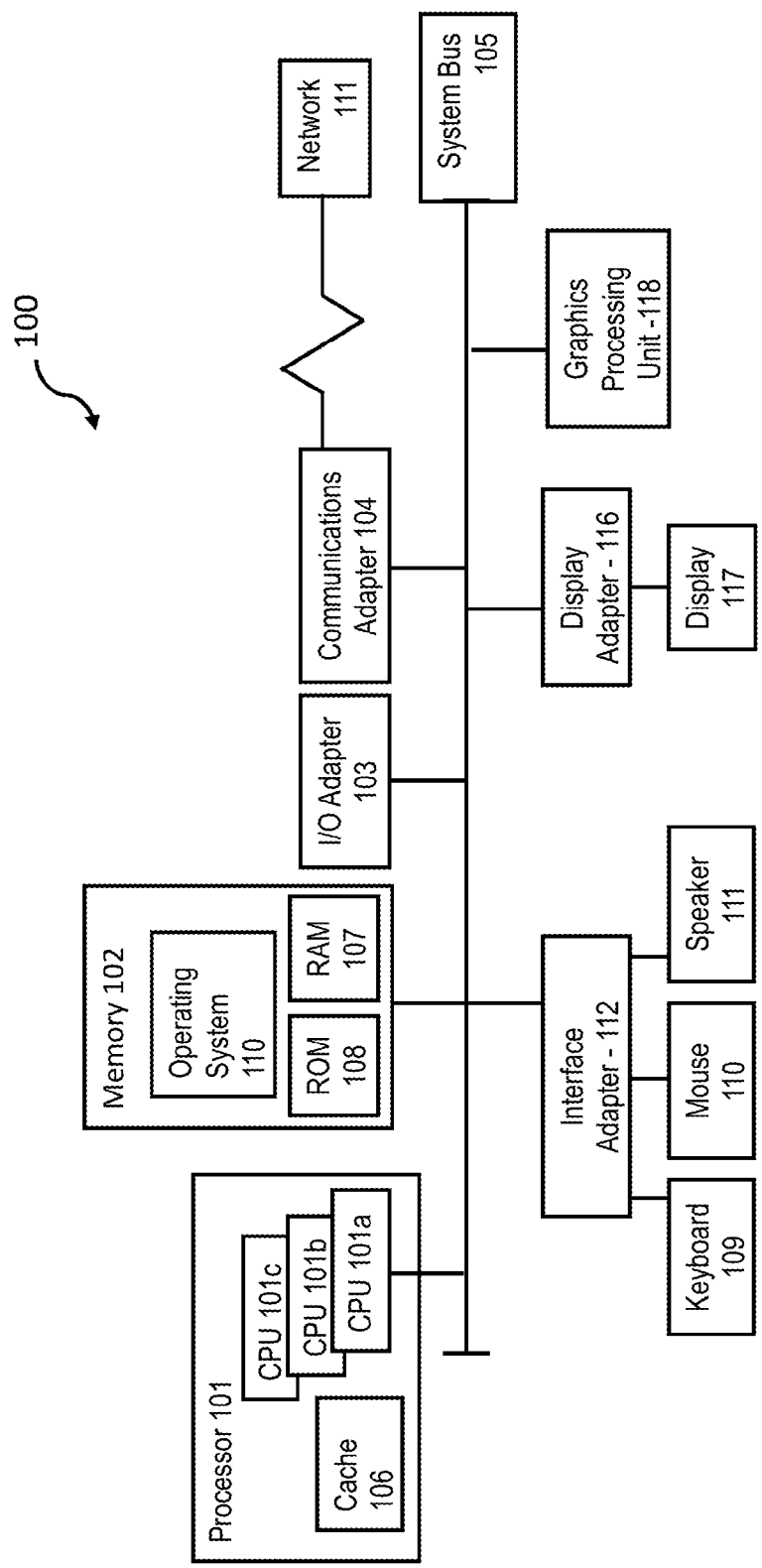
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices 109. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 110, speaker 111, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 101, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 113. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 111 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 113, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

People commonly use telecommunication (telecom) devices for communication between individuals or groups of individuals (e.g., a person to person call or a conference call). If one person on the call mutes her phone to have a side conversation, or to block unwanted background noise, she may forget to unmute and begin talking, only to later realize that her voice was not heard by the other call participants. In some other instances, the mute/unmute feature may be buried in a sub-menu of the telecom device (e.g., a smartphone), making it difficult or cumbersome to configure the audio channel so that they can be heard by the call participants. It may be advantageous to provide systems and methods for intelligently configuring an audio channel.

Figure 2:
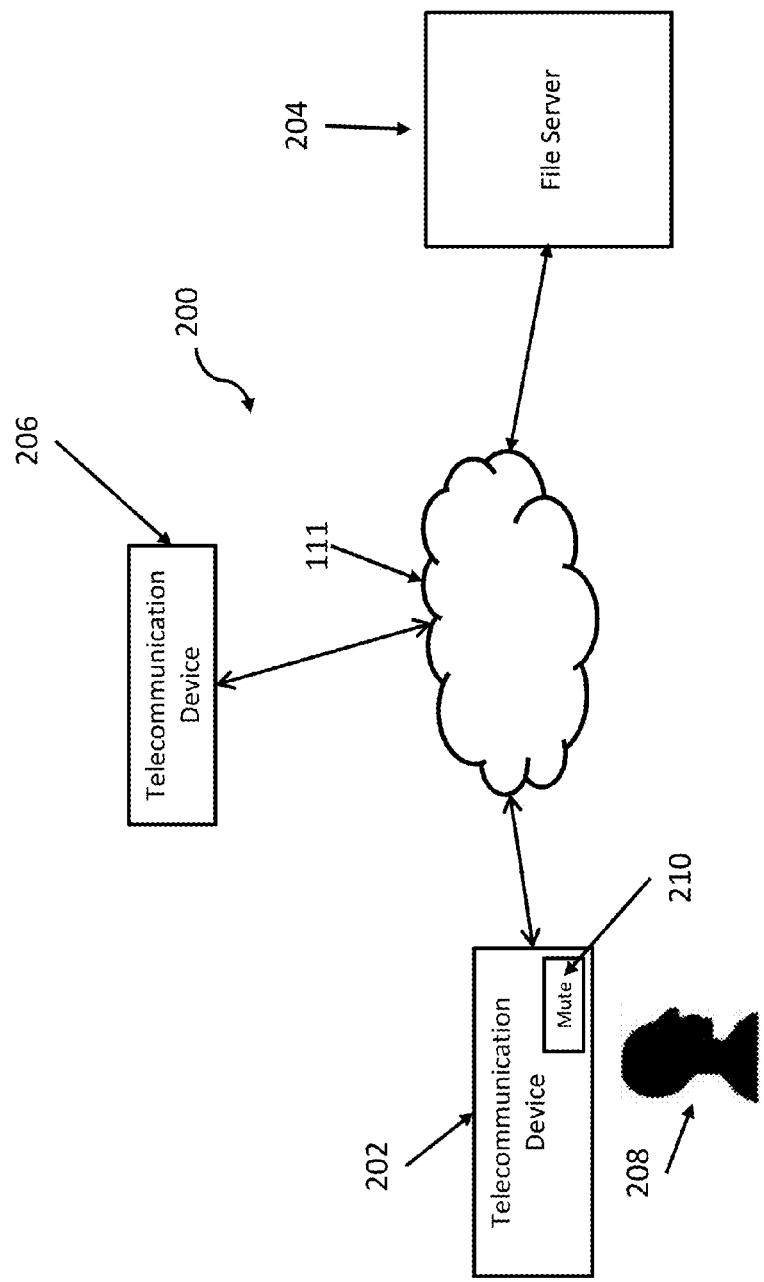
FIG. 2. depicts a computing environment for intelligent configuration of audio channels with background analysis in accordance with an exemplary embodiment.

Referring now to FIG. 2, a computing environment for intelligent configuration of audio channels with background analysis is depicted. According to some embodiments, a telecommunication (telecom) device 202 (hereafter "device 202" or "telecom device 202") may be in communication with one or more other devices, including, e.g., a file server 204, and/or one or more other telecom devices 206. A telecom device may be, for example, a telephone, a mobile phone, a smart phone, a voice over the internet (VIOP) connected device, a wired telephone, a computer (e.g., computer system 100), a computer running a video chat client, a web meeting client, and/or the like. Device 202 may be operatively connected to one or more other telecom devices 206 via network 111. Device 202 may also connect to one or more other computing systems including, for example, file server 204. According to some embodiments, device 202 and device 206 may connect directly to one another.

In some aspects, user 208 may call another user (not shown) operating device 206 to discuss a business topic. At some point in the conversation, someone (an individual not part of the telephone meeting) may enter the office of user 208 to ask a question. The question may be unrelated to the topic of conversation held between device 202 and device

206. Accordingly, user 208 may turn his head from the phone to have an unrelated side conversation with the visitor to his office. Normally, prior to having the side conversations in the midst of a conference call, a user may mute their phone to avoid interrupting the meeting or interjecting unintended noise on the call. In this example, user 208 may configure the audio channel by activating a mute functionality on device 202 (e.g., mute button 210). According to some embodiments, device 202 may intelligently configure the audio channel by monitoring the audio feed on the channel, analyzing the context of the conversation, and analyzing the background noise and other cues.

Figure 3:
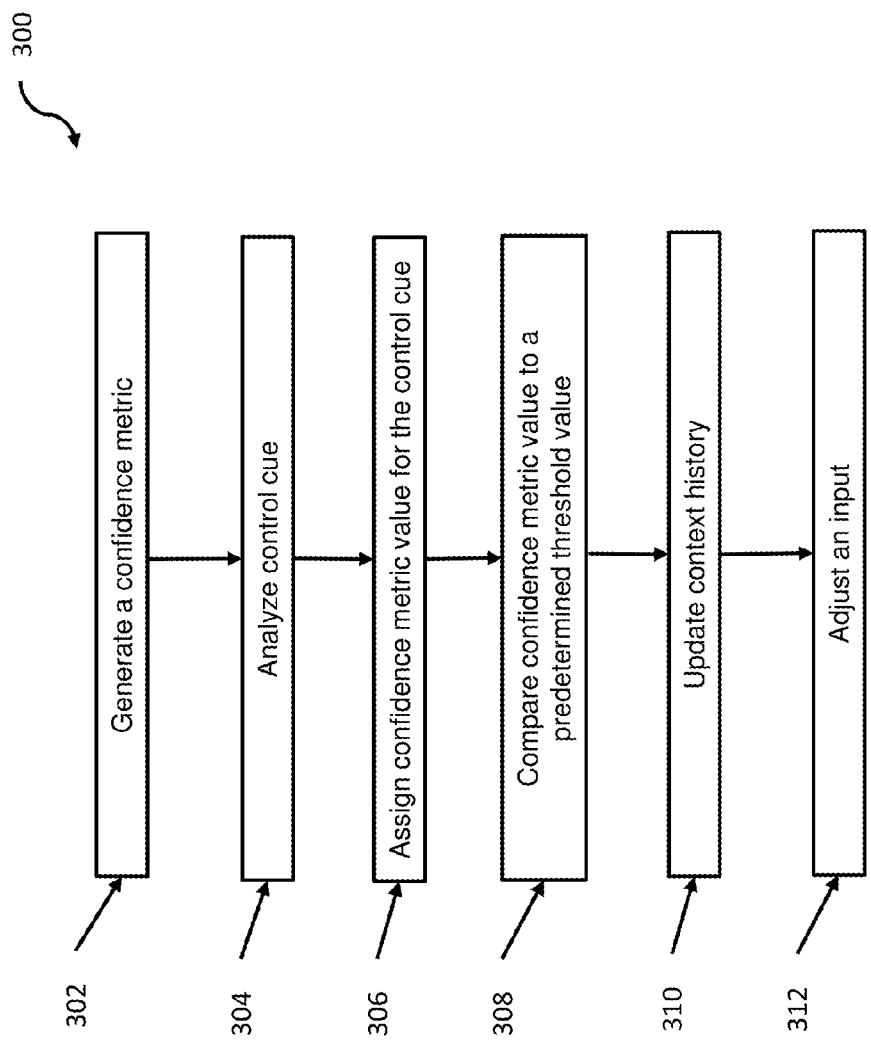
FIG. 3 depicts a flow diagram of a method for intelligent configuration of audio channels with background analysis in accordance with an exemplary embodiment.

FIG. 3 depicts a flow diagram of a method 300 for intelligent configuration of audio channels with background analysis in accordance with an embodiment. In general, according to method 300, a device (e.g., device 202) may monitor a call, and listen for cues that device 202 should mute or unmute the audio channel of the call. The control cues may provide information from which a weight of reliability may be assigned to the control cues. The relative weight of reliability may be indicated in a confidence metric as a confidence metric value.

As described herein, a mute/unmute functionality in a telecom device (e.g., device 202) may be a button (e.g., mute button 210), a menu item, a menu pulldown, a radio button, a toggle, etc., with the functionality of muting an input on a telecom device. Although described herein as a "button," it should be appreciated that audio channel controls that include a mute/unmute functionality may take any of a number of forms not described herein, and may be activated in many ways. Although a "button is pushed" in embodiments herein, it is contemplated that any of the many control options for operating the mute/unmute functionality are contemplated, and are not meant to be limiting in nature.

Referring again to FIG. 3, at block 302, device 202 may monitor an audio feed between two telecom devices (e.g., devices 202 and 206), and listen for cues indicative of a desire to mute or unmute the audio channel. Device 202 may generate a confidence metric based on an analysis of the audio feed. A confidence metric may include information relating to the confidence level that the control cue is indicative that a control action is appropriate (e.g., by automatically muting or unmuting the audio feed).

According to some embodiments, device 202 may use control cues to determine whether device 202 should assert dynamic control of the audio channel. In some embodiments, a control cue may be, for example, a long silence (seconds, minutes, etc.), a clearing of one's throat, a verbalization of a name of a call participant, etc. In other embodiments, a control cue can be one or more of an input volume, an output volume, a spoken word, a series of spoken words having a conversational context, accelerometer data, photoelectric data, and/or global positioning system (GPS) data.

Control cues may have varying degrees of clarity and/or ambiguity with respect to their indicative strength for predicting that a control action is appropriate. For example, if a control cue is clear and unambiguous (e.g., a relatively long (5-10 second) period of silence in an otherwise vigorous discussion), then the control cue indicating the long silence control cue may be assigned a high relative value in the analysis of whether the cue indicates that a control action is thereafter appropriate. A high relative confidence metric value indicates a high reliability (e.g., a high probability value in a probability table) that the particular control cue should trigger a mute or unmute action.

For example, in some embodiments, the control cue categorized as a "low volume" control cue may be indicative that a call participant (e.g., user 208) is speaking at a lower volume than the volume observed over most of the call (e.g., a call between device 202 and device 206). The lower volume may be an attempt to mask a side conversation from the audio input (microphone, etc.). In another aspect, a control cue category "muffled voice input" may be indicative that a muffled sound quality of the input to device 202 is perceived, as if a hand were placed over the microphone of a device in an attempt to physically mute the device by covering the microphone. In both aspects, device 202 may assign a lower value for the confidence metrics the control cues "low relative volume" and "muffled voice input since a low-volume (having a lower amplitude than the average amplitude of other portions of the audio feed), or muffled voice can be ambiguous in meaning with respect to a desire to mute or unmute the audio channel. For example, a voice could be muffled simply because the user shifted phone positions or inadvertently placed part of their hand over the microphone.

Accordingly, at block 302, device 202 may monitor the audio feed and generate one or more confidence metrics that may be used to determine whether a user's outgoing audio channel should be dynamically muted or unmuted.

In some embodiments, at block 304, device 202 may analyze the one or more control cues, and at block 306, assign a confidence metric value for the control cue based on the analysis. In some embodiments, the analysis may include categorizing the control cue based on a database or lookup table of known control cues. In some embodiments, device 202 may assign a predetermined confidence metric value by accessing a lookup table and/or database of cue types and corresponding assigned metric values. The lookup table may be stored locally on device 202 (e.g., in memory 102 of device 202). In other aspects, a reference table may be stored in one or more remote file servers (e.g., file server 204).

The predetermined metric value may be assigned at block 306 according to a category of cue type. For example, one cue type may be "long silence," and have a relative score of 7 out of 10, because a long silence is generally indicative of a desire to stop speaking and listen to another party speak. As another example, a cue type may be "muffled voice" and have a relative score of 3.5 out of 10, for the above-noted ambiguous meaning of a generally muffled voice. In other embodiments, a cue type may be explicit speech indicating desire to mute, (e.g., "I will mute my phone and listen to your reply"). In this example, the "explicit speech" cue type may be assigned 10 out of 10.

Is some aspects, at block 308 device 202 may compare the confidence metric value to a predetermined threshold value. The predetermined threshold value may be indicative of whether the confidence metric value is sufficient to trigger an audio input configuration.

In some embodiments, when device 202 determines that the one or more metric values meet a predetermined threshold, device 202 may update a context history indicating the environmental context by which a mute or unmute action was taken. A context history may include a plurality of correlations between a contextual situation and the user's control response to that situation. For example, according to some embodiments, if the confidence metric value does not indicate a sufficient probability that device 202 should configure an input (e.g., either mute or unmute the audio input), but then observes that user 208 unmuted device 202 directly after some contextual situation (e.g., user clears throat), then at block 310 the context history can be updated to note this correlation. Over time and with use, the confidence metric may become more intelligent by learning one or more user's patterns, habits, etc. At block 312, device 202 may configure an audio channel input based on the cue type and confidence metric and the context history. In some embodiments, the context history may be based on a plurality of telecommunication audio feeds.

Figure 4:
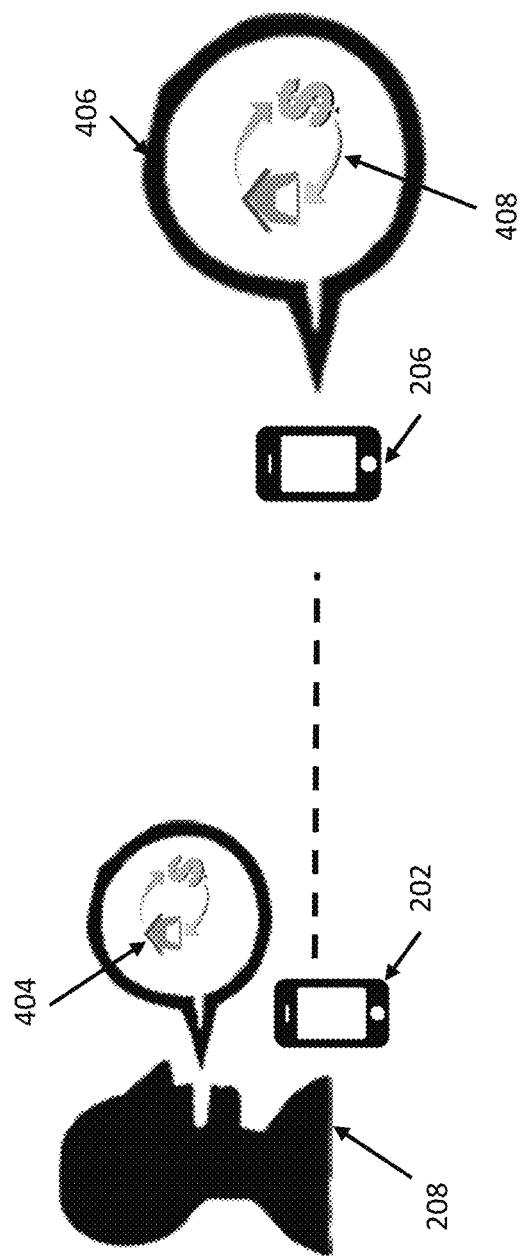
FIG. 4 depicts a flow diagram of generating confidence metrics, in accordance with exemplary embodiments.

According to some embodiments, device 202 may configure an audio channel input based on an analysis of conversational context. Referring now to FIG. 4, a user (e.g., user 208) may operate device 202 in a conference call with one or more other users (not shown) operating other telecom devices (e.g., device 206). Device 202 may identify at least one word verbalized in on the telecommunication audio feed and determine a relative context of the conversation based on the at least one word. For example, the topic of conversation may be real estate investing (depicted as conversational context 404). Device 202 may determine that the topic 404 being discussed by user 208 on the conference call is the same subject 408 being discussed by one or more other call participants. Accordingly, device 202 may determine that one or more words that do not fit the context of the conversation 404. Words not fitting the context of the conversation may indicate a high probability that device 202 should be muted.

Figure 5:
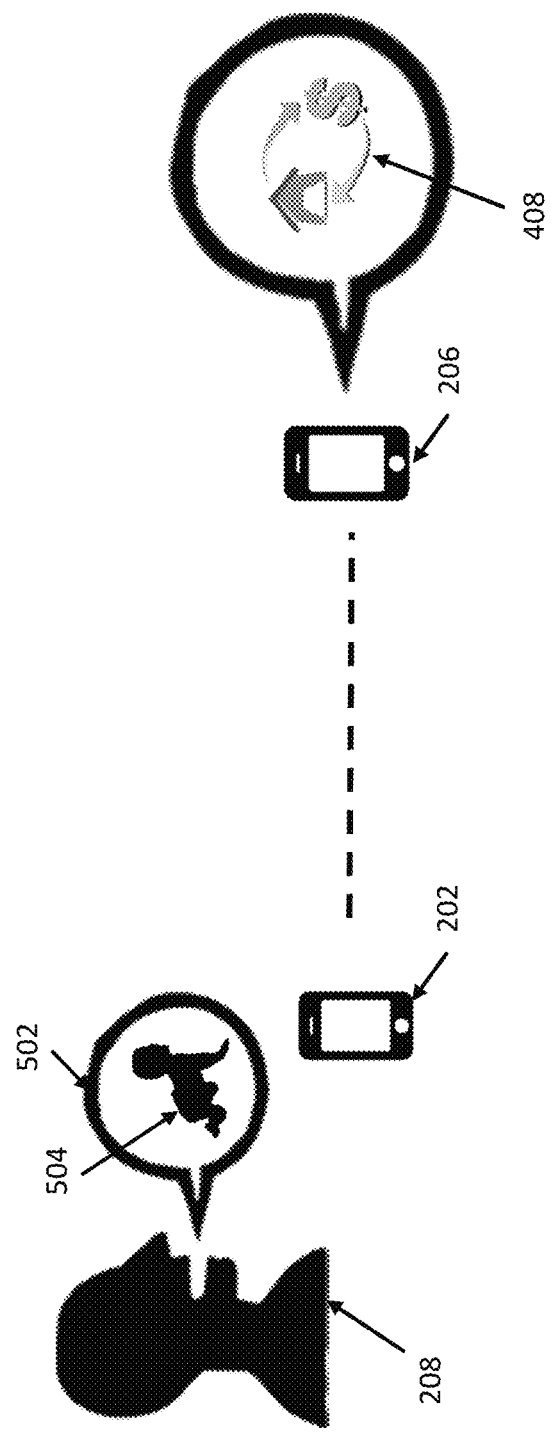
FIG. 5 depicts a flow diagram of generating confidence metrics, in accordance with exemplary embodiments.

For example, referring now to FIG. 5, user 208 may be on the same conference call of FIG. 4, discussing real estate topic 408. At some point, user 208 may configure device 202 to mute his voice so he can talk to a family member (e.g., baby 504). Baby conversation topic 502 may have nothing to do with real estate topic 408. However, when the conversation (topic 408) is directed to user 208, that user may clear his throat in preparation for a response. The control cue type "clears throat" may indicate a high probability that device 202 should be unmuted. Device 202 may assign a confidence metric value 8.5 for cue metric type "clears throat," and compare the metric value to a predetermined threshold value.

The predetermined threshold value (e.g., 6 out of 10) may be less than the assigned confidence metric value of 8.5 assigned to the cue metric type "clears throat." Device 202 may also note that user 208 has cleared his throat before speaking on multiple occasions in this and/or other conference calls. Thus, device 202 may update the context history to show that user 208 often clears his throat before speaking, and adjust the predetermined metric value for that cue type accordingly. Accordingly, device 202 may configure the input of the audio channel to unmute based on the confidence metric and the context history.

Figure 6:
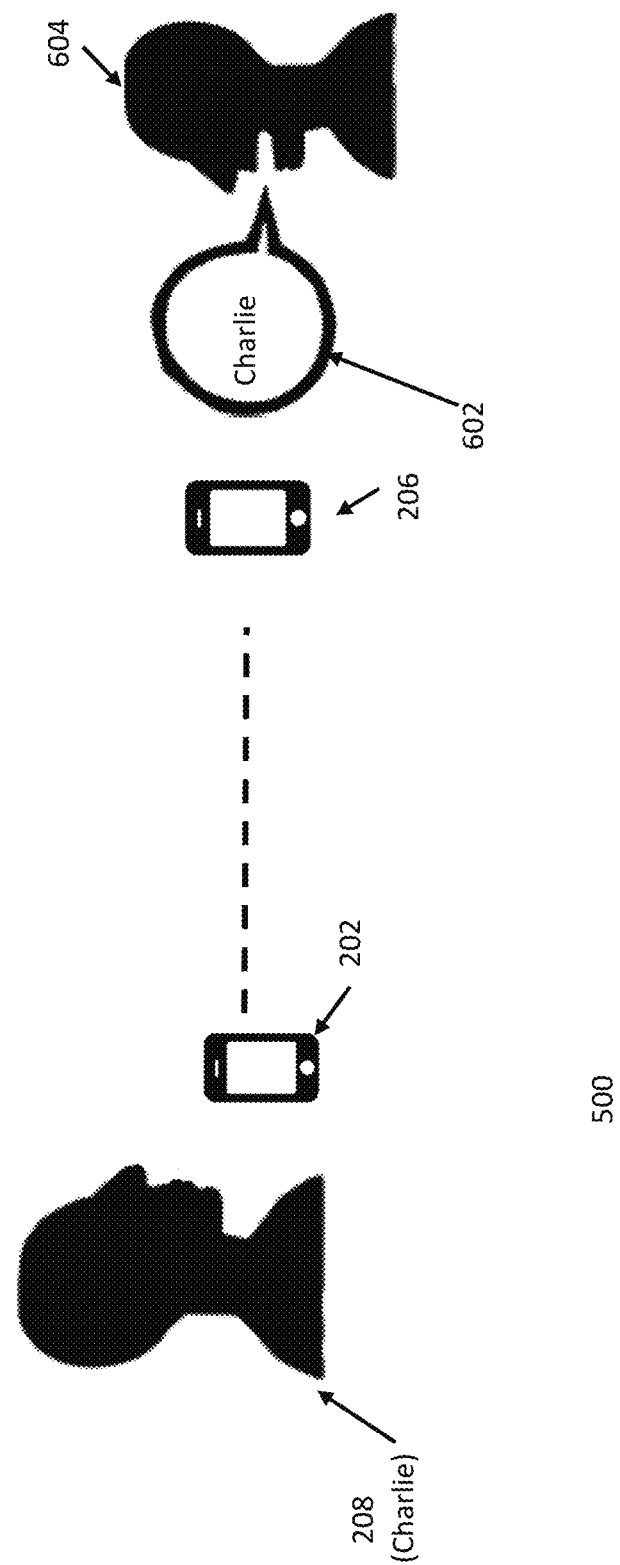
FIG. 6 depicts a flow diagram of generating confidence metrics, in accordance with exemplary embodiments.

FIG. 6 depicts another contextual cue indicative of a user's name (e.g., user 208 "Charlie"). According to some embodiments, if user 604 says "Charlie, don't you agree?", then device 202 may assign a high confidence metric value of 10 out of 10 to the control cue type "says user's name".

Figure 7:
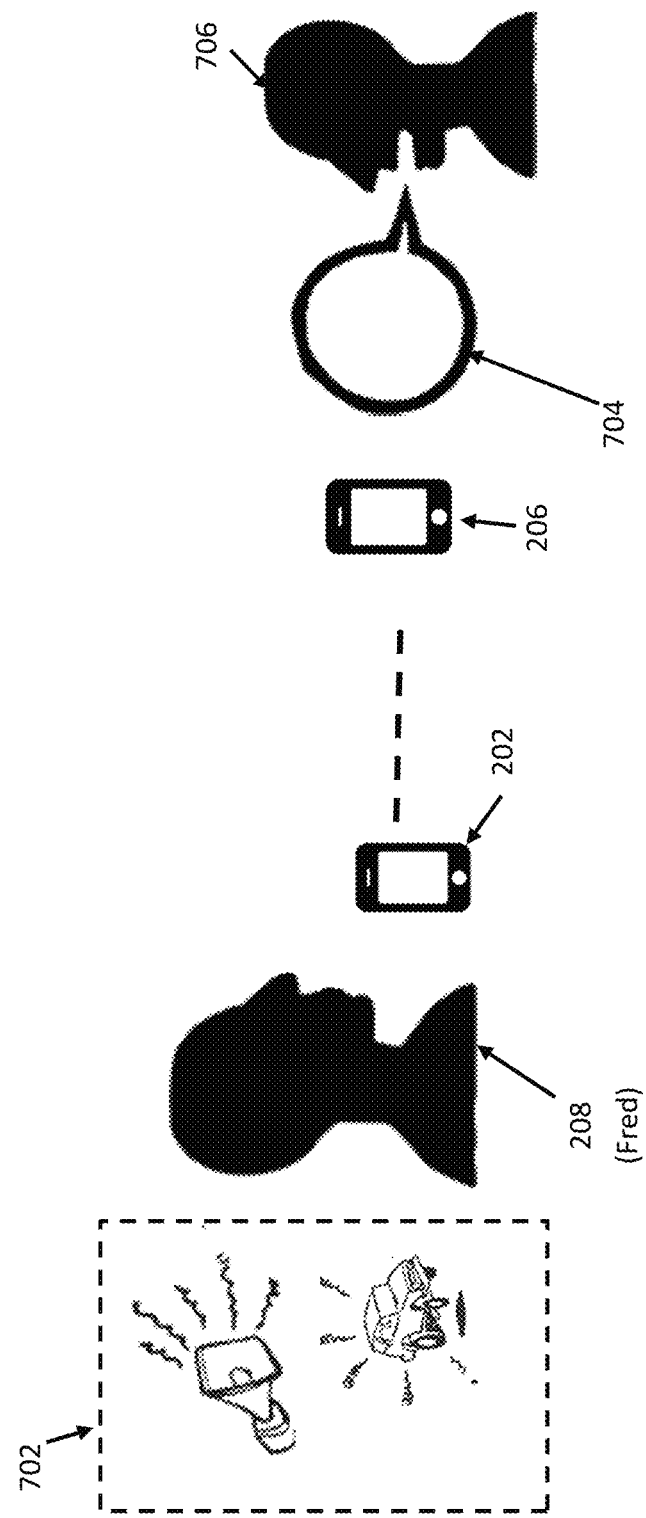
FIG. 7 depicts a flow diagram of generating confidence metrics, in accordance with exemplary embodiments.

In other embodiments, a control cue may be in indication of background noise. For example, referring now to FIG. 7, user 208 may be discussing any topic (e.g., topic 704) with one or more other participants 706. Over the history of the call, device 202 may determine that the average amplitude of call volume is X, and note that suddenly device 202 picks up background noise 702 having an amplitude of 4×. Accordingly, device 202 may assign a metric value commensurate with the exemplary control cue type "high background noise" and take an appropriate action in configuring the mute or unmute of the audio feed.

Figure 8:
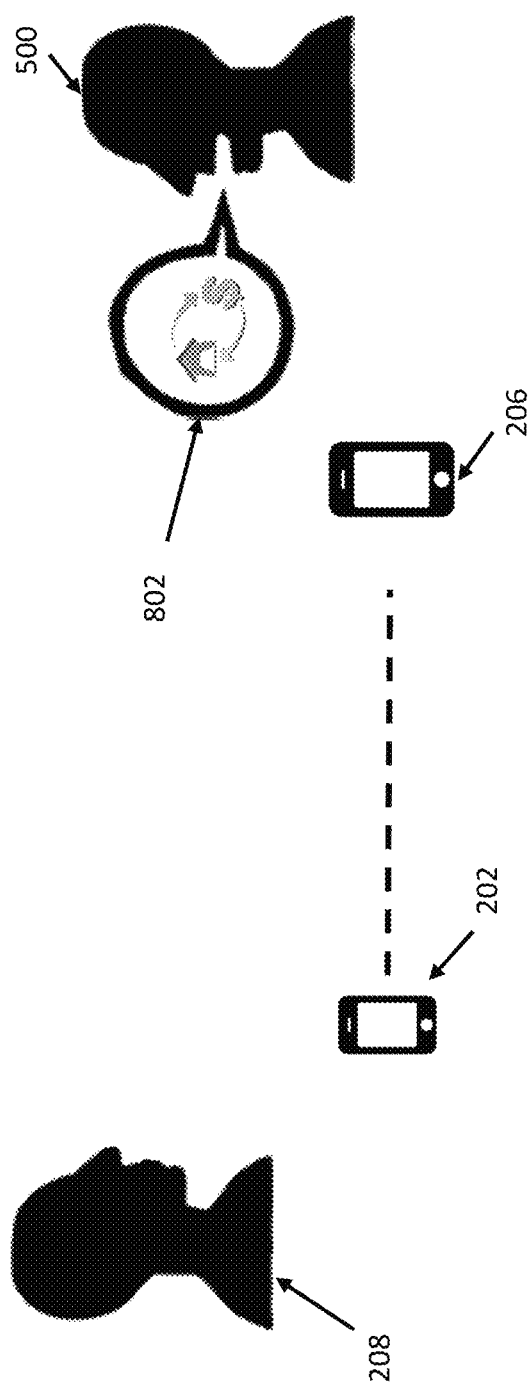
FIG. 8 depicts a flow diagram of generating confidence metrics, in accordance with exemplary embodiments.

In another aspect, as depicted in FIG. 8, over the course of conversation 802, user 208 may remain silent for a predetermined time period. Accordingly, device 202 may mute the audio channel of device 202. When device 202 determines that user 208 verbalizes any response, device 202 may unmute the audio channel to transmit his response. In some aspects, a control cue type may also be a predetermined time period of high or low volume, where the volume is an amplitude measured with respect to an average amplitude. In another aspect the control cue may be a general silence for a predetermined period of time (e.g., 10 seconds).

Figure 9:
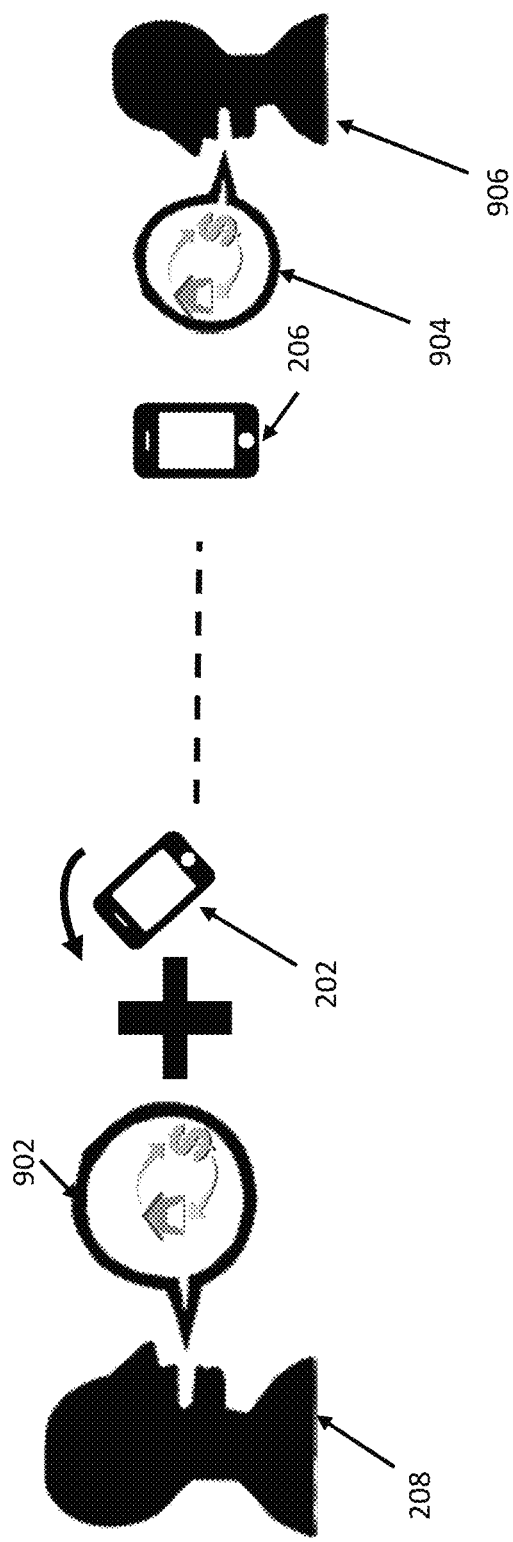
FIG. 9 depicts a flow diagram of generating confidence metrics, in accordance with exemplary embodiments.

In other embodiments, device 202 may determine from a combination of control cues that the predetermined threshold is met. For example, as depicted in FIG. 9, device 202 may determine that the context 902 of user 208's verbalization is similar to context 904 of another user's (e.g., user 906) verbalization. In addition, device 202 may determine, from accelerometer data on device 202, that device 202 has changed positions (e.g., user 208 places the phone to her ear). Accordingly, device 202 may combine the control cue "topic of conversation" and control cue "changes position", and use the combination of control cues to configure an input of the audio channel based on the confidence metric and context history.

In other aspects, device 202 may determine control metric values based on one or more user inputs. For example, device 202 may prompt for various contextual situations and matching responses. A contextual situation question may be, for example, "what words do you generally use before you speak?", or "do you clear your throat before speaking?" Accordingly, device 202 may configure one or more control metric values based on user input.

In other embodiments, the metric value sensitivity can be configured based on user input. For example, a cue sensitivity setting may assign a particular weight for throat clearing, which may be higher or lower than a sensitivity setting for another cue type.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. For example, it should be appreciated that the control cue types and control metric values exemplified herein are examples only, and are not limiting. Although several control cue types are described above, it is contemplated that any number of contextual cue types having a variety of control metric values are possible according to embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for configuring an audio channel with a processor, the method comprising:
    generating a confidence metric indicative of at least one control cue in a telecommunication audio feed, wherein generating the confidence metric comprises:
        analyzing the at least one control cue to determine a cue type;
        assigning a confidence metric value for the at least one control cue based on the cue type, wherein the cue type comprises both explicit speech to perform an action and muffled voice having a lower amplitude than the average amplitude of other portions of the audio feed;
        comparing the confidence metric value to a predetermined threshold value associated with the cue type;
        updating a context history with the cue type and the confidence metric value; and
        configuring an input of the audio channel based on the confidence metric and the context history.

2. The method of claim 1, wherein the processor configures the input of the audio channel by one of muting the input and unmuting the input.

3. The method of claim 1, wherein analyzing the at least one control cue comprises:
 identifying at least one word verbalized on the telecommunication audio feed; and
 determining a relative context of the conversation based on the at least one word.

4. The method of claim 1, wherein the at least one control cue comprises one or more of an input volume, an output volume, a spoken word, a series of spoken words having a conversational context, accelerometer data, photoelectric data, and a global positioning system (GPS) data.

5. The method of claim 1, wherein the cue type is a predetermined time period of high or low volume, wherein the volume is an amplitude measured with respect to an average amplitude.

6. The method of claim 1, wherein the at least one control cue is a verbalized name of a telecommunication participant in the telecommunication audio feed.

7. The method of claim 1, wherein the at least one control cue is silence for a predetermined period of time.

8. The method of claim 1, wherein the at least one control cue is one or more of a low volume word and a combination of words having a predetermined relevance value.

9. The method of claim 8, wherein the predetermined relevance value is based on a context of a conversation on the telecommunication audio feed.

10. The method of claim 1, wherein the at least one control cue is a combination of an accelerometer reading and an input volume.

11. The method of claim 1, wherein creating the context history is indicative of one or more control cues associated with a particular user.

12. The method of claim 1, wherein the confidence metric comprises a plurality of control cues, and the confidence metric value increases with respect to a greater number of control cues.

13. The method of claim 1, further comprising outputting an audio cue indicative that the processor has configured the input to the audio channel.

14. The method of claim 1, wherein the processor prompts for user input regarding a cue sensitivity setting, and the confidence metric value is based in part on the cue sensitivity setting.

15. The method of claim 1, wherein the processor prompts for user input indicative of a situational context and a preferred response to the situational context.

16. The method of claim 1, wherein the context history is indicative of a situational context and a user's response to the situational context.

17. The method of claim 16, wherein the context history is based on a plurality of telecommunication audio feeds.

18. A system for configuring an audio channel, the system comprising an audio input device configured to receive a telecommunication audio feed input; and a processor operatively connected to the audio input device and configured to:
 monitor the audio feed input;
 generate a confidence metric indicative of at least one control cue in the audio feed;
 determine a cue type, wherein the cue type comprises both explicit speech to perform an action and muffled voice having a lower amplitude than the average amplitude of other portions of the audio feed;
 assign a confidence metric value for the at least one control cue based on the cue type;
 compare the confidence metric value to a predetermined threshold value associated with the cue type;
 update a context history with the cue type and the confidence metric value; and
 configure an input of the audio channel based on the confidence metric and the context history.

19. A non-transitory computer-readable storage medium storing a computer program product executable to perform a method, the method including:
 generating a confidence metric indicative of at least one control cue in a telecommunication audio feed, wherein generating the confidence metric comprises:
  analyzing the at least one control cue to determine a cue type;
  assigning a confidence metric value for the at least one control cue based on the cue type;
  comparing the confidence metric value to a predetermined threshold value associated with the cue type, wherein the cue type comprises both explicit speech to perform an action and muffled voice having a lower amplitude than the average amplitude of other portions of the audio feed;
 updating a context history with the cue type and the confidence metric value; and
 configuring an input of the audio channel based on the confidence metric and the context history.

* * * * *